Aug. 4, 1925. 1,548,197
J. M. KENDALL ET AL
ILLUMINATED GEAR SHIFT LEVER FOR AUTOMOBILES
Filed May 2, 1923
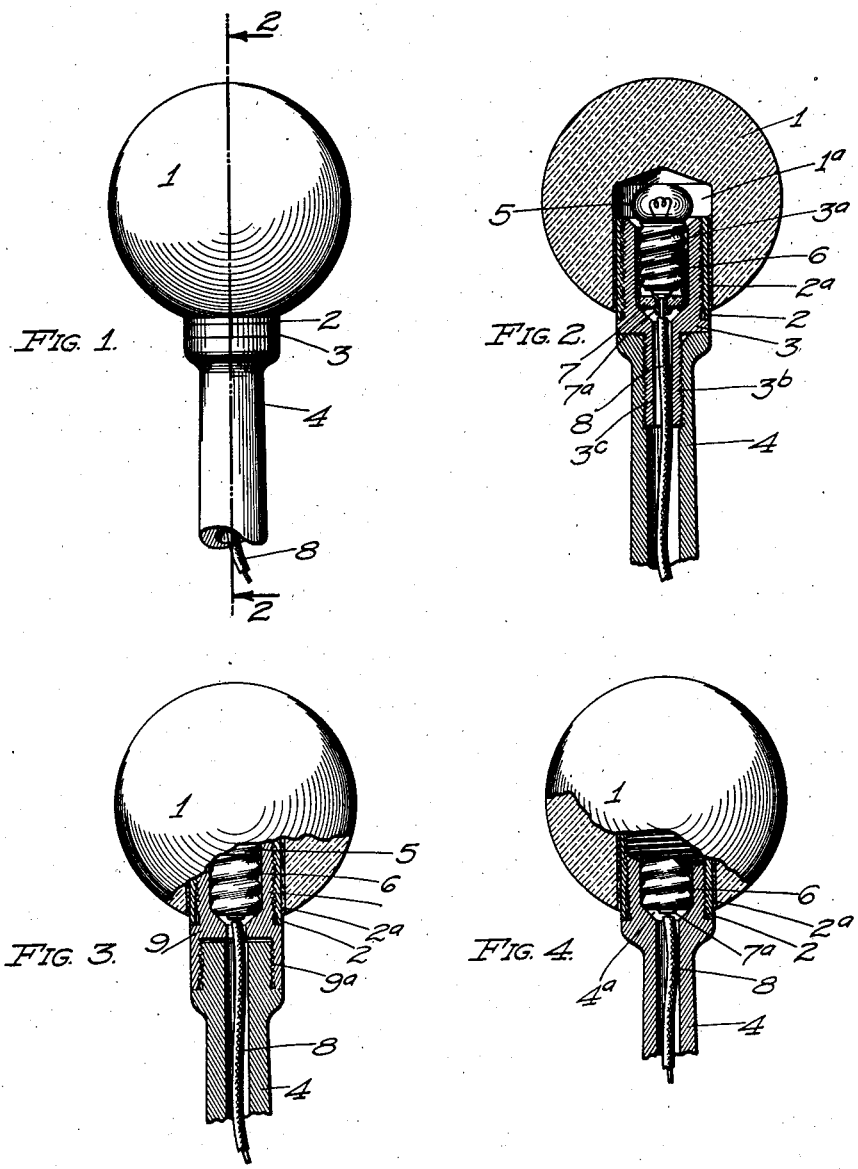
INVENTOR.
JOSEPH M. KENDALL.
ROY E. HARRIS.
BY A.B. Bowman
ATTORNEY Patented Aug. 4, 1925.

1,548,197

UNITED STATES PATENT OFFICE.

JOSEPH M. KENDALL AND ROY E. HARRIS, OF SAN DIEGO, CALIFORNIA.

ILLUMINATED GEAR-SHIFT LEVER FOR AUTOMOBILES.

Application filed May 2, 1923. Serial No. 636,084.

*To all whom it may concern:*

Be it known that we, JOSEPH M. KENDALL and ROY E. HARRIS, citizens of the United States, residing at San Diego, in the county of San Diego and State of California, have invented a certain new and useful Illuminated Gear-Shift Lever for Automobiles, of which the following is a specification.

Our invention relates to gear shift levers, for automobiles, and the objects of our invention are: first, to provide a gear shift lever with an illuminated knob on its extended end; second, to provide a gear shift lever knob which may be illuminated and which will also illuminate the interior of the front portion of the vehicle if desired; third, to provide a means for warming a gear shift lever knob; fourth, to provide an illuminated knob for gear shift levers which is adaptable for use in connection with various makes of gear shift levers now in use; fifth, to provide a novelly constructed gear shift lever for vehicles, and sixth, to provide a device of this class, which is very simple and economical of construction, durable, efficient, applicable for use with different makes of automobiles and which will not readily deteriorate or get out of order.

With these and other objects in view as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of the normally upper end of a vehicle gear shift lever apparatus showing our new construction; Fig. 2 is a sectional view thereof through 2—2 of Fig. 1; Fig. 3 is a partial sectional and elevational view of the upper end of the vehicle gear shift lever in a slightly modified form; and Fig. 4 is a similar view in another slightly modified form.

Similar characters of reference refer to similar parts and portions throughout the several views of the drawings.

The knob member 1, bushing 2, adapter 3, lever member 4, lamp 5, socket 6, socket end member 7 and electrical conductor 8 constitute the principal parts and portions of our vehicle gear shifting lever in its preferred form.

The knob member 1 is preferably spherical in shape, though it may be other shapes if desired, and is composed of translucent material, preferably onyx. It is provided in the one side to a little past the center with a recess 1ª as shown best in Fig. 2 of the drawings and in this recess is secured an internally threaded bushing 2, by means of cement 2ª, and so positioned that the end of the bushing 2 protrudes slightly from the knob member 1, as shown in the drawings. There is provided an adapter member 3 which is shaped as shown best in Fig. 2 of the drawings, provided with an enlarged externally threaded portion, adapted to fit the threads of the interior of the bushing 2 and provided with a recess 3ª therein adapted for the socket member 6 to fit snugly therein, and also provided with a reduced portion 3ᵇ, externally threaded adapted to fit the internally threaded end of the lever member 4. This reduced portion 3ᵇ is also provided with a hole 3ᶜ therein, adapted for the conductor 8. The socket member 6 is provided at one end with an end member 7 which is provided with a central hole in which is mounted an insulated bushing 7ª, in which is supported the conductor 8, the end of which forms a terminal for the terminal of the lamp 5 which is screwed into the socket 6. A conductor 8 connects at its other end with the battery or other source of electrical energy.

The lever member 4, it will be noted on the different vehicles varies considerably. In some cases the upper end is threaded externally, in some cases it is threaded internally, and is of varying sizes. In most cases this lever is solid, however, it is preferred to provide a hollow lever as shown in the drawings so that the conductor 8 will pass through the lever and from the lower end extend to the source of electrical energy, therefore, in Fig. 3 there is provided a modified form of adapter member 9 which is the same as the adapter 3 except that instead of a reduced portion the extended end is enlarged and provided with a threaded recess 9ª, adapted for the external threaded end of the lever 4, the construction of the knob and other portions being the same as in Fig. 1.

In the modified form, as shown in Fig. 4 of the drawings, the adapter is eliminated and the bushing 2 is adapted to screw on the externally threaded end of the lever itself, in which case the lever 4 is threaded externally adapted to receive the threads of the bushing 2. At the upper end, the lever is provided with a recess 4ª in which the bushing 6 is snugly fitted, the remaining portions of the structure being the same as in Figs. 1 and 2.

Though we have shown and described a particular construction, combination and arrangement of parts and portions, and certain modifications thereof, we do not wish to be limited to this particular construction, combination and arrangement nor to the modifications but desire to include in the scope of our invention the construction, combination and arrangement substantially as set forth in the appended claims.

It is obvious that with this construction there is provided a novel gear shift lever construction for automobiles in which the knob may be illuminated so that it is very conspicuous; that the light if desired may be made so that it will illuminate the interior of the front portion of the vehicle; that the knob will be slightly heated by the electric light bulb, thus making it warm in cold weather; that the adapter and other means for connection provide means adapting it for use in connection with various makes of gear shift levers for automobiles.

Having thus described our invention, what we claim as new and desire to secure by Letters Patent is:

1. In an automobile gear shift lever, an automobile gear shifting lever member, an adapter member secured at the free end of the said lever, a translucent knob for said lever provided with a recess in one side thereof, a bushing secured in said recess provided with internal threads adapted to fit on said adapter, an electric lamp socket secured in said adapter positioned inside of said translucent knob and an electric lamp mounted in said socket.

2. In an automobile gear shift lever, an automobile gear shifting lever member, an adapter member, secured at the free end of the said lever, a translucent knob for said lever provided with a recess in one side thereof, a bushing secured in said recess provided with internal threads adapted to fit on said adapter, an electric lamp socket secured in said adapter positioned inside of said translucent knob, an electric lamp mounted in said socket, and a conductor connecting said lamp with a source of electrical energy, extending longitudinally through said lever member.

In testimony whereof, we have hereunto set our hands at San Diego, California, this 25th day of January, 1923.

JOSEPH M. KENDALL.
ROY E. HARRIS.